United States Patent
Kim et al.

(10) Patent No.: US 9,899,677 B2
(45) Date of Patent: Feb. 20, 2018

(54) POSITIVE ACTIVE MATERIAL FOR RECHARGEABLE LITHIUM BATTERY, METHOD OF PREPARING SAME, AND RECHARGEABLE LITHIUM BATTERY INCLUDING SAME

(75) Inventors: Ji-Hyun Kim, Yongin-si (KR); Do-Hyung Park, Yongin-si (KR); Seon-Young Kwon, Yongin-si (KR); Min-Han Kim, Yongin-si (KR); Yu-Mi Song, Yongin-si (KR); Kyoung-Hyun Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 726 days.

(21) Appl. No.: 13/065,935

(22) Filed: Mar. 31, 2011

(65) Prior Publication Data

US 2011/0305953 A1    Dec. 15, 2011

(30) Foreign Application Priority Data

Jun. 13, 2010    (KR) .................. 10-2010-0055744

(51) Int. Cl.
*H01M 4/505*    (2010.01)
*H01M 4/525*    (2010.01)
(Continued)

(52) U.S. Cl.
CPC ............ *H01M 4/525* (2013.01); *C01G 53/50* (2013.01); *H01M 4/505* (2013.01);
(Continued)

(58) Field of Classification Search
CPC .... H01M 4/505; H01M 4/525; H01M 10/052; H01M 4/131
See application file for complete search history.

(56) References Cited

U.S. PATENT DOCUMENTS

| 7,364,793 | B2 | 4/2008 | Paulsen et al. |
| 7,445,871 | B2 | 11/2008 | Suh et al. |
| 2005/0142442 | A1* | 6/2005 | Yuasa et al. .................. 429/220 |

FOREIGN PATENT DOCUMENTS

| JP | 2000-348724 A | 12/2000 | |
| JP | 2001243952 A * | 9/2001 | .............. H01M 4/58 10/40 |

(Continued)

OTHER PUBLICATIONS

Machine translation for Takeuchi et al., JP 2001-243952 A.*

(Continued)

*Primary Examiner* — Barbara Gilliam
*Assistant Examiner* — Angela Martin
(74) *Attorney, Agent, or Firm* — Lewis Roca Rothgerber Christie LLP

(57) ABSTRACT

A positive active material for a rechargeable lithium battery including a lithium metal oxide represented by the following Chemical Formula 1, a method of preparing the same, and a rechargeable lithium battery including the same.

$$Li_aMeM'_kO_2 \quad \text{Chemical Formula 1}$$

In Chemical Formula 1,
Me is $Ni_xCo_yMn_z$, M' is Mg, Al, Fe, P, or a combination thereof, $0.955 \le a < 1.05$, $0.001 \le k \le 0.1$, $0.5 < x \le 0.65$, $0.1 < y \le 0.25$, $0.1 < z \le 0.25$, $x+y+z+k=1$,
M' is doped at a Li site and at least one of Ni, Co, and Mn sites, M' is doped in an amount at 0.1 mol % or 10 mol % or between 0.1 mol % and 10 mol % based on the total amount of Ni, Co, and Mn, and a doping mole ratio of M' doped at the Li site with respect to a Me site is in the following range: about $0.001 \le A_{Li}/A_{Me} \le$ about $0.5$.

15 Claims, 9 Drawing Sheets

(51) Int. Cl.
  *H01M 10/052* (2010.01)
  *H01M 4/131* (2010.01)
  *C01G 53/00* (2006.01)

(52) U.S. Cl.
  CPC ...... *C01P 2002/52* (2013.01); *C01P 2002/54* (2013.01); *C01P 2004/03* (2013.01); *H01M 4/131* (2013.01); *H01M 10/052* (2013.01)

(56) References Cited

FOREIGN PATENT DOCUMENTS

| | | |
|---|---|---|
| JP | 2004-111076 A | 4/2004 |
| JP | 2006-054159 | 2/2006 |
| JP | 2009-129820 A | 6/2009 |
| KR | 10-2003-0088247 A | 11/2003 |
| KR | 10-0694658 B1 | 3/2007 |

OTHER PUBLICATIONS

Hand translation for Takeuchi et al., JP 2001-243952 A.*
Machine English Translation of JP 2004-111076 A.
KIPO Office action dated Mar. 4, 2016, for Korean priority Patent application 10-2010-0055744, (7 pages).
English machine translation of Japanese Publication 2006-054159 dated Feb. 23, 2006, listed above, (27 pages).
KIPO Notice of Allowance dated Sep. 28, 2016, for corresponding Korean Patent Application No. 10-2010-0055744 (5 pages).

* cited by examiner

POSITIVE ACTIVE MATERIAL FOR RECHARGEABLE LITHIUM BATTERY, METHOD OF PREPARING SAME, AND RECHARGEABLE LITHIUM BATTERY INCLUDING SAME

CROSS-REFERENCE TO RELATED APPLICATION

This application claims priority to and the benefit of Korean Patent Application No. 10-2010-0055744, filed in the Korean Intellectual Property Office on Jun. 13, 2010, the entire content of which is incorporated herein by reference.

BACKGROUND

1. Field

This disclosure relates to a positive active material for a rechargeable lithium battery, a method of preparing the same, and a rechargeable lithium battery including the same.

2. Description of the Related Art

Lithium rechargeable batteries have recently drawn attention as a power source for small portable electronic devices. They use an organic electrolyte solution and thereby have twice the discharge voltage of a conventional battery using an alkaline aqueous solution, and accordingly have high energy density.

The rechargeable lithium battery is fabricated by injecting an electrolyte into a battery cell, which includes a positive electrode including a positive active material capable of intercalating/deintercalating lithium ions and a negative electrode including a negative active material capable of intercalating/deintercalating lithium ions.

For a positive active material, $LiCoO_2$ is widely used. However, since cobalt (Co) is a rare metal, it costs more in the preparation and has unstable supply issues. Accordingly, a positive active material including Ni (nickel) or Mn (manganese) has been researched.

Also, a positive active material including Ni (nickel) can provide a high-capacity and high voltage battery. However, the positive active material has an unstable structure and thus, decreases capacity. Also, due to a reaction with an electrolyte solution, it has thermal instability.

SUMMARY

An aspect of an embodiment of the present invention is directed toward a positive active material capable of preventing discharge voltage drop and having excellent thermal stability.

Another aspect of an embodiment of the present invention is directed toward a method of manufacturing the positive active material.

Another aspect of an embodiment of the present invention is directed toward a rechargeable lithium battery including the positive active material and having high capacity.

According to one embodiment of the present invention, provided is a positive active material for a rechargeable lithium battery including a lithium metal oxide represented by the following Chemical Formula 1.

Chemical Formula 1

In Chemical Formula 1,
Me is $Ni_xCo_yMn_z$, M' is Mg, Al, Fe, P, or a combination thereof, $0.95 \le a < 1.05$, $0.001 \le k \le 0.1$, $0.5 < x \le 0.65$, $0.1 < y \le 0.25$, $0.1 < z \le 0.25$, $x+y+z+k=1$, and M' is doped at a Li site and at least one of Ni, Co, and Mn sites of Me, M' is doped in an amount at 0.1 mol % or 10 mol % or between 0.1 mol % and 10 mol % based on the total amount of Ni, Co, and Mn, and a doping mole ratio of M' doped at the Li site with respect to a Me site is in the following range: about $0.001 \le A_{Li}/A_{Me} \le$ about 0.5.

In Chemical Formula 1, M' may be doped in the amount of at 1 mol % or 4 mol % or between 1 mol % and 4 mol % based on the total amount of Ni, Co, and Mn.

In Chemical Formula 1, the doping mole ratio of M' doped at the Li site with respect to the Me site may be in the following range: about $0.05 \le A_{Li}/A_{Me} \le$ about 0.5.

The positive active material may have a heat flow maximum value at 10 W/g or 18 W/g or between 10 W/g and 18 W/G when measured using Differential Scanning calorimetry (DSC).

In another embodiment of the present invention, provided is a method of preparing the positive active material for a rechargeable lithium battery, which includes: preparing a precipitate by co-precipitating each metal source including Ni, Co, and Mn, and a doping element (M') source including Mg, Al, Fe, P, or a combination thereof, and ammonium hydroxide ($NH_4OH$) or sodium hydroxide (NaOH);

mixing the precipitate with a lithium source material in a weight ratio at 1:1 or 1:1.05 or between 1:1 and 1:1.05; and heat-treating the mixture to prepare a lithium metal oxide represented by the above Chemical Formula 1.

The heat treatment may be performed at a temperature ranging at 700° C. or between 700° C. and 900° C., and in particular, at 800° C. or between 800° C. and 900° C.

The heat treatment may be performed for about 8 to about 15 hours, and in particular, for about 8 to about 11 hours.

The co-precipitation reaction may be performed at a reaction speed at 600 rpm or 800 rpm or between 600 rpm and 800 rpm, and/or at pH of about 10 to about 12 for about 8 to about 10 hours at a temperature at 35° C. or 40° C. or between 35° C. and 40° C.

In still another embodiment of the present invention, provided is a rechargeable lithium battery including a positive electrode including the positive active material, a negative electrode, and an electrolyte solution impregnating the positive electrode and the negative electrode.

The rechargeable lithium battery may have discharge capacity at 160 mAh/g or 190 mAh/g or between 160 mAh/g and 190 mAh/g.

Hereinafter, further embodiments will be described in more detail.

In one embodiment, the positive active material prevents discharge voltage drop of a rechargeable lithium battery and brings about the rechargeable lithium battery having high-capacity and excellent efficiency.

DETAILED DESCRIPTION

Exemplary embodiments of the present invention will hereinafter be described in more detail. However, these embodiments are only exemplary, and the present invention is not limited thereto.

As used herein, when description is not otherwise provided, the term "a doping mole ratio of M' doped at a Li site with respect to a Me site" refers to a mole ratio "$A_{Li}/A_{Me}$" acquired by dividing the amount of a doping element (M') doped at the site of lithium (Li) by the amount of a doping element (M') doped at the site of transition elements (Me). As used herein, when description is not otherwise provided, the term "doped" refers to partial or full substitution at at least one element.

Hereinafter, a positive active material according to one embodiment is described.

The positive active material may include a lithium metal oxide represented by the following Chemical Formula 1.

Chemical Formula 1

In Chemical Formula 1, Me represents a transition element including Ni, Co, and Mn, and for example may be represented by $Ni_xCo_yMn_z$.

In one embodiment, x, y, and z are in the following ranges: 0.5<x≤0.65, 0.1<y≤0.25, and 0.1<z≤0.25. In one embodiment, when the transition elements (Me) include Ni are within the above ranges, a rechargeable lithium battery including the transition elements (Me) has high capacity.

M' represents a doping element, and includes Mg, Al, Fe, P, or a combination thereof.

The doping element (M') may be doped at a Li site and at the transition element (Me) site, that is to say, it may be doped at Ni, Co, and/or Mn sites.

In one embodiment, when the doping element is doped at the Li site, a positive active material has a stable structure. In one embodiment, when the doping element is doped at the transition element (Me) site, a positive active material stabilizes voltage of an associated rechargeable lithium battery.

The doping element (M') may be doped in an amount at 0.1 mol % or 10 mol % or between 0.1 mol % and 10 mol % based on the entire amount of Ni, Co, and Mn; in particular, at 1 mol % or 4 mol % or between 0.1 mol % and 4 mol %; and more particularly, at 2 mol % or 4 mol % or between 2 mol % and 4 mol %.

For example, when the doping element (M') is included in the lithium metal oxide in an amount of 4 mol % based on the entire amount of Ni, Co, and Mn, a part of the 4 mol % is substituted at the Li site, and the rest of the 4 mol % is substituted at at least one site of Ni, Co, and Mn. When the doping element (M') is doped at at least one site of the Ni, Co, and Mn, x, y, and z stoichiometric ratios in the above Chemical Formula 1 are changed within each range.

In one embodiment, when the doping element is included within the above ranges, a discharge voltage drop due to a Ni increase is prevented, and thermal stability deterioration due to oxygen deintercalation accompanying lithium ion deintercalation in the positive active material is improved. In other words, the doping element is strongly bonded with oxygen in the lithium metal oxide and decreases oxygen deintercalation at a high temperature, resultantly improving thermal stability of a positive active material.

A doping mole ratio of the doping element (M') doped at a Li site with respect to a transition element (Me) site is in the following range: about 0.001≤$A_{Li}/A_{Me}$≤about 0.5, for example, about 0.05≤$A_{Li}/A_{Me}$≤about 0.5. In one embodiment, when the $A_{Li}/A_{Me}$ is within the above range, the positive active material prevents a discharge voltage drop of a rechargeable lithium battery due to a Ni increase. When the positive active material has a stable structure, it may improve thermal stability, and thus providing an associated rechargeable lithium battery with excellent efficiency.

The $A_{Li}/A_{Me}$ is measured using a Bruker D8 Advance device and a DBWS (Cerius2, msi) program. In particular, the measurement is performed under a condition of 40 kV/40 mA, 10° C. to 120° C., 0.02° C./step, a continuous mode, 10 s exposure/step (takes about 15 hours), and divergency slit/antiscatt. slit/receiving slit=0.5 deg/0.5 deg/0.20 mm. The measurement is analyzed by performing general fitting, such as, i) scale factor adjustment, ii) zero-shift adjustment, iii) background fitting, iv) peak profile (Pseudo-Voigt function), v) lattice constant, vi) asymmetry adjustment, vii) preferred orientation, viii) isotropic temperature factor (measured by fixing an atom position to be 0 at 25° C.), ix) atomic position, x) atomic occupancy, and the like.

k is 0.001≤k≤0.1, x+y+z+k=1, and 0.95≤a<1.05.

The lithium metal oxide may be prepared in a solid-phase method of mixing a lithium source powder, a metal source powder such as Ni, Co, Mn, and the like, and a doping element (M') containing a source powder and heat-treating the mixture.

In addition, the lithium metal oxide may be prepared in a co-precipitation method of mixing each metal source including Ni, Co, and Mn and a doping element (M') source including Mg, Al, Fe, P, or a combination thereof in a solvent, adding ammonium hydroxide ($NH_4OH$) or sodium hydroxide (NaOH) to the mixture, continuously mixing them and precipitating the mixture in a co-precipitator, adding a lithium source thereto, and heat-treating the resulting mixture.

Herein, the co-precipitation reaction may be performed at pH of about 10 to about 12 for about 8 to about 10 hours at a temperature at 30° C. or 50° C. or between 30° C. and 50° C., and in particular, at a temperature at 35° C. or 40° C. or between 35° C. and 40° C. at a reaction speed at 600 rpm or 800 rpm or between 600 rpm and 800 rpm. When the co-precipitation is performed within the condition range, a positive active material may have a set or predetermined composition ratio among transition elements (Me), that is to say, a set composition ratio among Ni, Co, and Mn according to one embodiment of the present invention. In addition, a positive active material may be prepared to have a doping mole ratio $A_{Li}/A_{Me}$, which refers to a ratio of a doping element (M') at a Li site with respect to a transition element (Me) site. Accordingly, the positive active material may prevent a discharge voltage drop and have excellent thermal stability, and thus providing an associated rechargeable lithium battery with excellent efficiency.

The precipitate and the lithium source material may be mixed in a weight ratio at 1:1 or 1:1.05 or between 1:1 and 1:1.05, but excluding 1.05. When the lithium source material is used within the above range to prepare a positive active material, it may be somewhat lost during the heat treatment and less included in the final positive active material product than the range. When the final product is measured using ICP (inductively coupled plasma), lithium is decreased by an amount, making more room for doping a doping element (M') at the lithium site.

Also, in one embodiment, when the lithium source is included within the above range, a positive active material according to one embodiment of the present invention prevents a discharge voltage drop and has excellent thermal stability, and thus provides an associated rechargeable lithium battery with excellent efficiency.

Examples of the lithium source may include lithium carbonate, lithium acetate, lithium hydroxide, or the like, and examples of the metal source may include a metal-containing acetate, a metal-containing nitrate, a metal-containing hydroxide, a metal-containing oxide, a metal-containing sulfate, or the like, but are not limited thereto. The metal source may include a metal-containing sulfate. The solvent may include water, ethanol, methanol, acetone, or the like.

The heat treatment may be performed at a temperature at 700° C. or 900° C. or between 700° C. and 900° C.; and in particular, at 800° C. or 900° C. or between 800° C. and 900° C. in the solid-phase method and the co-precipitation method. In addition, the heat treatment may be performed for about 8 to about 15 hours, and in particular, for about 8 to about 11 hours. When the heat treatment is performed within the temperature range and the time range, a doping element (M') is prevented from forming an oxide phase and thus is well-doped. In addition, the positive active material may prevent a discharge voltage drop due to a Ni increase and improve thermal stability, and thus providing an associated rechargeable lithium battery with excellent efficiency.

When the positive active material is measured using Differential Scanning calorimetry (DSC), it may have a heat flow maximum value at 10 W/g or 18 W/g or between 10 W/g and 18 W/g.

Hereinafter, a rechargeable lithium battery including the positive active material is illustrated with reference to FIG. 1.

Figure 1:
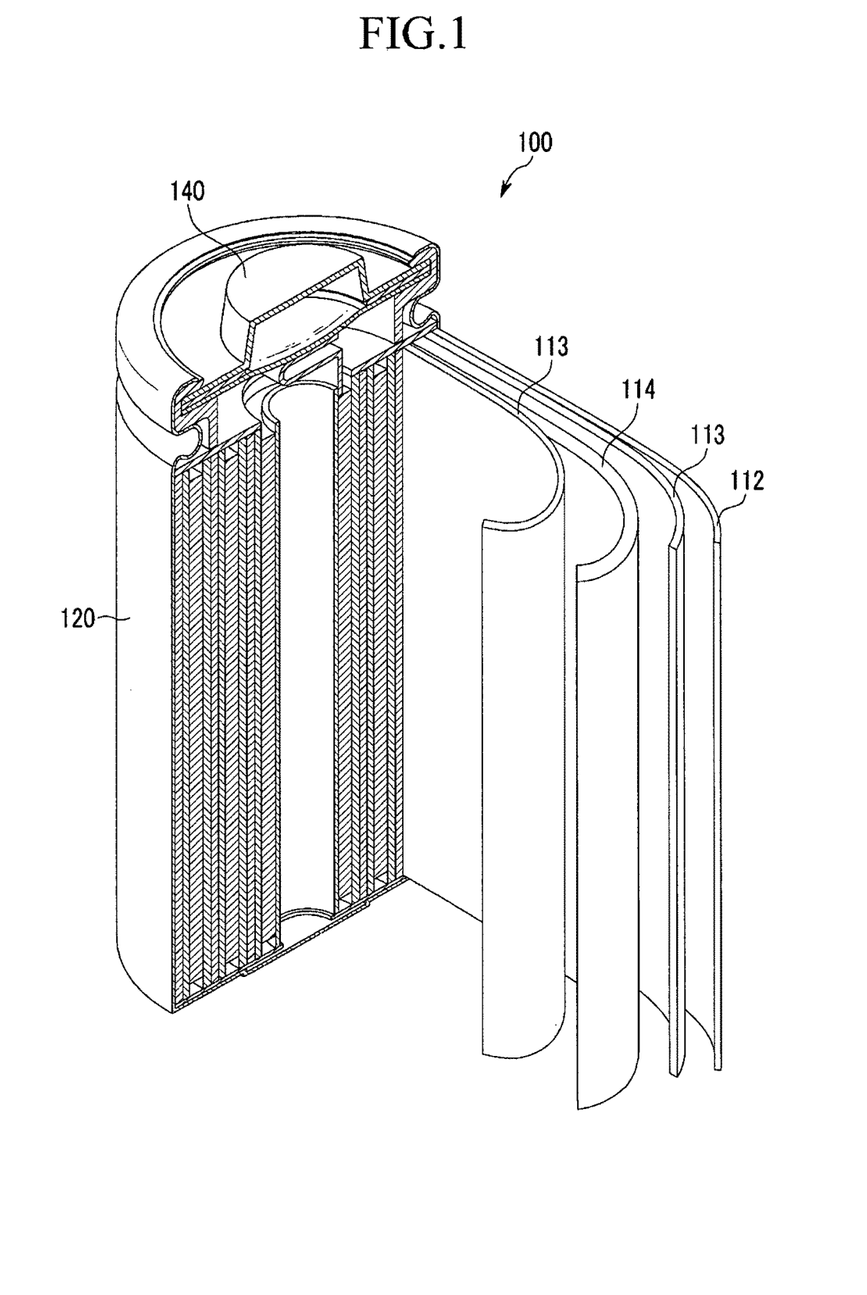
FIG. 1 is the schematic diagram of a rechargeable lithium battery according to one embodiment.

FIG. 1 is a schematic diagram of a rechargeable lithium battery according to one embodiment.

Referring to FIG. 1, the rechargeable lithium battery 100 according to one embodiment includes an electrode assembly including a positive electrode 114, a negative electrode 112 facing the positive electrode 114, a separator 113 interposed between the positive electrode 114 and negative electrode 112, an electrolyte impregnating the positive electrode 114, a negative electrode 112, a separator 113, a battery case 120 including the electrode assembly, and a sealing member 140 sealing the battery case 120.

The positive electrode 114 includes a positive active material layer and a current collector supporting the positive active material layer. The positive active material layer includes a positive active material, a binder, and selectively a conductive material.

The current collector may be aluminum (Al), but is not limited thereto.

The positive active material may include a lithium metal oxide described above. When the lithium metal oxide is used as a positive active material, it may accomplish high-capacity of a rechargeable lithium battery, prevent its discharge voltage drop due to a Ni increase, and improve thermal stability.

The binder improves binding properties of the positive active material particles to each other and to a current collector. Examples of the binder include at least one selected from polyvinyl alcohol, carboxylmethyl cellulose, hydroxypropyl cellulose, polyvinyl chloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, or the like, but are not limited thereto.

As for the conductive material, any electro-conductive material that does not cause a chemical change may be used. Non-limiting examples of the conductive material include a carbon-based material such as natural graphite, artificial graphite, carbon black, acetylene black, ketjen black, or carbon fiber; a metal-based material such as a metal powder or a metal fiber including copper, nickel, aluminum, or silver; a conductive polymer such as a polyphenylene derivative; or mixtures thereof.

The negative electrode 112 includes a negative electrode current collector and a negative active material layer disposed on the negative electrode current collector.

The negative electrode current collector may include a copper foil.

The negative active material layer includes a negative active material, a binder, and optionally a conductive material.

The negative active material may include a material that reversibly intercalates/deintercalates lithium ions, a lithium metal, a lithium metal alloy, a material being capable of doping and de-doping lithium, or a transition metal oxide.

The material that reversibly intercalates/deintercalates lithium ions includes a carbon material. The carbon material may be any generally-used carbon-based negative active material for a lithium ion rechargeable battery. Examples of the carbon material include crystalline carbon, amorphous carbon, or mixtures thereof. The crystalline carbon may be non-shaped, or sheet, flake, spherical, or fiber shaped natural graphite or artificial graphite. The amorphous carbon may be a soft carbon (carbon obtained through sintering at a low temperature), a hard carbon (carbon obtained through sintering at a high temperature), mesophase pitch carbide, fired coke, or the like.

Examples of the lithium metal alloy include lithium and a metal selected from Na, K, Rb, Cs, Fr, Be, Mg, Ca, Sr, Si, Sb, Pb, In, Zn, Ba, Ra, Ge, Al, or Sn.

Examples of the material being capable of doping and de-doping lithium include Si, $SiO_x$ (0<x<2), a Si—Y alloy (where Y is selected from the group consisting of an alkaline metal, an alkaline-earth metal, a group 13 element, a group 14 element, a transition element, a rare earth element, and combinations thereof, and is not Si), Sn, $SnO_2$, a Sn—Y alloy (where Y is selected from the group consisting of an alkaline metal, an alkaline-earth metal, a group 13 element, a group 14 element, a transition element, a rare earth element, and combinations thereof, and is not Sn), or mixtures thereof. At least one of these materials may be mixed with $SiO_2$. The element Y is Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof.

Examples of the transition metal oxide include vanadium oxide, lithium vanadium oxide, or the like.

The binder improves binding properties of the negative active material particles to each other and to a current collector. Examples of the binder include at least one selected from the group consisting of polyvinyl alcohol, carboxylmethyl cellulose, hydroxypropyl cellulose, polyvinyl chloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, or the like, but are not limited thereto.

The conductive material is included to improve electrode conductivity. Any electrically conductive material may be used as a conductive material unless it causes a chemical change. Examples of the conductive material include natural graphite, artificial graphite, carbon black, acetylene black, ketjen black, a carbon fiber, a metal powder or a metal fiber including copper, nickel, aluminum, silver, and so on, a polyphenylene derivative, or mixtures thereof.

The negative electrode 112 and the positive electrode 114 may be fabricated by a method including mixing the negative active material, a conductive material, and a binder to provide an active material composition, and coating the composition on a current collector.

The electrode manufacturing method is well known, and thus is not described in detail in the present specification. The solvent includes N-methylpyrrolidone or the like, but is not limited thereto.

The solvent may include a non-aqueous organic solvent and a lithium salt.

The non-aqueous organic solvent serves as a medium for transmitting ions taking part in the electrochemical reaction of a battery. The non-aqueous organic solvent may include a carbonate-based, ester-based, ether-based, ketone-based, alcohol-based, or aprotic solvent.

Examples of the carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylmethyl carbonate (EMC), ethylene carbonate (EC), propylene carbonate (PC), butylene carbonate (BC), or the like.

When the linear carbonate compounds and cyclic carbonate compounds are mixed, an organic solvent having high dielectric constant and low viscosity may be provided. The cyclic carbonate and the linear carbonate are mixed together in a volume ratio at 1:1 or 1:9 or between 1:1 and 1:9.

Examples of the ester-based solvent may include n-methylacetate, n-ethylacetate, n-propylacetate, dimethylacetate, methylpropionate, ethylpropionate, γ-butyrolactone, decanolide, valerolactone, mevalonolactone, caprolactone, or the like. Examples of the ether-based solvent include dibutyl ether, tetraglyme, diglyme, dimethoxyethane, 2-methyltetrahydrofuran, tetrahydrofuran, or the like, and examples of the ketone-based solvent include cyclohexanone or the like. Examples of the alcohol-based solvent include ethyl alcohol, isopropyl alcohol, or the like.

The non-aqueous organic solvent may be used singularly or in a mixture. When the organic solvent is used in a mixture, the mixture ratio may be controlled in accordance with a desirable battery performance.

The non-aqueous electrolyte may further include overcharge inhibitor additives such as ethylene carbonate, pyrocarbonate, or the like.

The lithium salt supplies lithium ions in the battery, operates a basic operation of a rechargeable lithium battery, and improves lithium ion transportation between positive and negative electrodes.

Non-limiting examples of the lithium salt include $LiPF_6$, $LiBF_4$, $LiSbF_6$, $LiAsF_6$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers), LiCl, LiI, $LiB(C_2O_4)_2$ (lithium bisoxalato borate, LiBOB), or combinations thereof.

The lithium salt may be used in a concentration ranging from about 0.1M to about 2.0M. In one embodiment, when the lithium salt is included at the above concentration range, electrolyte performance and lithium ion mobility are enhanced due to optimal electrolyte conductivity and viscosity.

The separator 113 may be a single layer or multilayer, and for example is made of polyethylene, polypropylene, polyvinylidene fluoride, or combinations thereof.

The rechargeable lithium battery may have capacity at 160 mAh/g or 190 mAh/g or between 160 mAh/g and 190 mAh/g under discharge condition of 4.3V, constant current (CC)/constant voltage (CV) mode, and 0.1 C rate; and in particular, at 165 mAh/g or 180 mAh/g or between 165 mAh/g and 180 mAh/g, and thus, may prevent a discharge voltage drop and improve thermal stability, and thus providing an associated rechargeable lithium battery with high capacity.

Hereinafter, the embodiments are illustrated in more detail with reference to examples. However, the following are exemplary embodiments and are not limiting.

A person having ordinary skill in this art can sufficiently understand parts of the present invention that are not specifically described.

Preparation of Positive Active Material

Example 1

About 3M of a $NiSO_4$ aqueous solution, about 3M of a $CoSO_4$ aqueous solution, and about 3M of a $MnSO_4$ aqueous solution were mixed in a mole ratio of 6:2:2. The mixture was mixed with an about 3M of a $MgSO_4$ aqueous solution in a mole ratio of 1:0.01. Next, about 7M of a NaOH aqueous solution and about 1M of a $NH_4OH$ aqueous solution were added thereto.

The resulting mixture was co-precipitated at pH 11 for 8 hours at 40° C. at a reaction speed of about 800 rpm, thereby preparing a metal hydroxide precursor. The precursor was washed with water, dried in a 120° C. oven, filtered, and then mixed with $Li_2CO_3$ in a weight ratio of about 1:1.03 using a handy mixer. The resulting mixture was heated by increasing at a rate of 5° C./min to 850° C. and then fired at that temperature for about 10 hours, thereby preparing a lithium metal oxide including Li, transition elements (Me) (Ni, Co, and Mn), and Mg as a positive active material.

Herein, the Mg was doped in an amount of 1 mol % based on the entire amount of Ni, Co, and Mn, and had a doping mole ratio $A_{Li}/A_{Me}$ of 0.11.

Example 2

A positive active material was prepared according to the same method as Example 1, except that about 3M of a NiSO$_4$ aqueous solution, about 3M of a CoSO$_4$ aqueous solution, and about 3M of a MnSO$_4$ aqueous solution were mixed in a mole ratio of 6:2:2, and then the mixture was mixed with about 3M of a MgSO$_4$ aqueous solution in a mole ratio of 1:0.02.

Herein, the Mg was doped in an amount of 2 mol % based on the entire amount of Ni, Co, and Mn, and had a doping mole ratio A$_{Li}$/A$_{Me}$ of 0.25.

Example 3

A positive active material was prepared according to the same method as Example 1, except that about 3M of a NiSO$_4$ aqueous solution, about 3M of a CoSO$_4$ aqueous solution, and about 3M of a MnSO$_4$ aqueous solution were mixed in a mole ratio of 6:2:2 and then the mixture was mixed with about 3M of a MgSO$_4$ aqueous solution in a mole ratio of 1:0.04.

Herein, the Mg was doped in an amount of 4 mol % based on the entire amount of Ni, Co, and Mn, and had a doping mole ratio A$_{Li}$/A$_{Me}$ of 0.33.

Example 4

A positive active material was prepared according to the same method as Example 1, except that about 3M of a NiSO$_4$ aqueous solution, about 3M of a CoSO$_4$ aqueous solution, and about 3M of a MnSO$_4$ aqueous solution were mixed in a mole ratio of 6:2:2, and then the mixture was mixed with about 3M of a MgSO$_4$ aqueous solution in a mole ratio of 1:0.06.

Herein, the Mg was doped in an amount of 6 mol % based on the entire amount of Ni, Co, and Mn, and had a doping mole ratio A$_{Li}$/A$_{Me}$ of 0.5.

Comparative Example 1

About 3M of a NiSO$_4$ aqueous solution, about 3M of a CoSO$_4$ aqueous solution, and about 3M of a MnSO$_4$ aqueous solution were mixed in a mole ratio of 6:2:2. The mixture was mixed with about 7M of a MgSO$_4$ aqueous solution and about 1M of a NH$_4$OH aqueous solution.

The resulting mixture was co-precipitated at pH 11 for 8 hours at 40° C. at a reaction speed of about 800 rpm, thereby acquiring a metal hydroxide precursor. The precursor was washed with water, dried in a 120° C. oven, and filtered. Then, the resulting precursor was mixed with Li$_2$CO$_3$ in a weight ratio of about 1:1.03 using a handy mixer. The prepared mixture was heated by increasing the temperature at a rate of 5° C./min to 850° C., and then fired at that temperature for about 10 hours, thereby preparing a LiNi$_{0.6}$Co$_{0.2}$Mn$_{0.2}$O$_2$ positive active material.

Comparative Example 2

About 3M of a NiSO$_4$ aqueous solution, about 3M of a CoSO$_4$ aqueous solution, and about 3M of a MnSO$_4$ aqueous solution were mixed in a mole ratio of 5:2:3. The mixture was added to about 3M of a MgSO$_4$ aqueous solution in a mole ratio of 1:0.01. Next, about 7M of a NaOH aqueous solution and about 1M of a NH$_4$OH aqueous solution were added thereto.

The mixture was co-precipitated at pH 12.5 for 8 hours at 40° C. at a reaction speed of about 800 rpm, thereby preparing a metal hydroxide precursor. The precursor was washed with water, dried in a 120° C. oven, and filtered. The resulting precursor was mixed with Li$_2$CO$_3$ in a weight ratio of about 1:1.15 using a handy mixer.

The prepared mixture was heated by increasing the temperature at a rate of 5° C./min to 900° C. and then fired at that temperature for about 10 hours, thereby preparing a lithium metal oxide including Li, transition elements (Me) (Ni, Co and Mn), and Mg as a positive active material.

Herein, the Mg was doped in an amount of 1 mol % based on the entire amount of Ni, Co, and Mn, and had a doping mole ratio A$_{Li}$/A$_{Me}$ of 0.05.

Comparative Example 3

A positive active material was prepared according to the same method as Comparative Example 2, except that about 3M of a NiSO$_4$ aqueous solution, about 3M of a CoSO$_4$ aqueous solution, and about 3M of a MnSO$_4$ aqueous solution were mixed in a mole ratio of 5:2:3, and the mixture was mixed with about 3M of a MgSO$_4$ aqueous solution in a mole ratio of 1:0.02.

Herein, the Mg was doped in an amount of 2 mol % based on the entire amount of Ni, Co, and Mn, and had a doping mole ratio A$_{Li}$/A$_{Me}$ of 0.14.

Comparative Example 3

A positive active material was prepared according to the same method as Comparative Example 2, except that about 3M of a NiSO$_4$ aqueous solution, about 3M of a CoSO$_4$ aqueous solution, and about 3M of a MnSO$_4$ aqueous solution were mixed in a mole ratio of 5:2:3, and the mixture was mixed with about 3M of a MgSO$_4$ aqueous solution in a mole ratio of 1:0.04.

Herein, the Mg was doped in an amount of 4 mol % based on the entire amount of Ni, Co, and Mn, and had a doping mole ratio A$_{Li}$/A$_{Me}$ of 0.17.

Comparative Example 5

A positive active material was prepared according to the same method as Comparative Example 2, except that about 3M of a NiSO$_4$ aqueous solution, about 3M of a CoSO$_4$ aqueous solution, and about 3M of a MnSO$_4$ aqueous solution were mixed in a mole ratio of 5:2:3, and the mixture was mixed with about 3M of a MgSO$_4$ aqueous solution in a mole ratio of 1:0.06.

Herein, the Mg was doped in an amount of 6 mol % based on the entire amount of Ni, Co, and Mn, and had a doping mole ratio A$_{Li}$/A$_{Me}$ of 0.36.

Comparative Example 6

About 3M of a NiSO$_4$ aqueous solution, about 3M of a CoSO$_4$ aqueous solution, and about 3M of a MnSO$_4$ aqueous solution were mixed in a mole ratio of 5:2:3. Next, about 7M of a NaOH aqueous solution and about 1M of a NH$_4$OH aqueous solution were added to the mixture.

The mixture was co-precipitated at pH 12.5 for 8 hours at 40° C. at a reaction speed of about 800 rpm, thereby preparing a metal hydroxide precursor. The precursor was washed with water in a 120° C. oven, dried, filtered, and then mixed with Li$_2$CO$_3$ in a weight ratio of about 1:1.15 using a handy mixer. The resulting mixture was heated by increasing the temperature at a rate of 5° C./min to 850° C. and then fired at that temperature for about 10 hours, thereby preparing a LiNi$_{0.5}$Co$_{0.2}$Mn$_{0.3}$O$_2$ positive active material.

Comparative Example 7

About 3M of a $NiSO_4$ aqueous solution, about 3M of a $CoSO_4$ aqueous solution, and about 3M of a $MnSO_4$ aqueous solution were mixed in a mole ratio of 5:2:3. Then, the mixture was mixed with about 3M of a $MgSO_4$ aqueous solution in a mole ratio of 1:0.01. Next, about 7M of a NaOH aqueous solution and about 1M of a $NH_4OH$ aqueous solution were added thereto.

The resulting mixture was co-precipitated at pH 12.5 for 8 hours at 40° C. at a reaction speed of about 800 rpm, preparing a metal hydroxide precursor. The precursor was washed in a 120° C. oven, dried, and filtered, and then mixed with $Li_2CO_3$ in a weight ratio of about 1:1.15 using a handy mixer.

The resulting mixture was heated by increasing the temperature at a rate of 5° C./min to 850° C. and then fired at that temperature for about 10 hours, thereby preparing a lithium metal oxide positive active material including Li, transition elements (Me) (Ni, Co, and Mn), and Mg. Herein, the Mg was doped in an amount of 1 mol % based on the entire amount of Ni, Co, and Mn, and had a doping mole ratio $A_{Li}/A_{Me}$ of 0.003.

Comparative Example 8

About 3M of a $NiSO_4$ aqueous solution, about 3M of a $CoSO_4$ aqueous solution, and about 3M of a $MnSO_4$ aqueous solution were mixed in a mole ratio of 6:2:2. The mixture was mixed with about 3M of a $MgSO_4$ aqueous solution in a mole ratio of 1:0.04. Then, about 7M of a NaOH aqueous solution and about 1M of a $NH_4OH$ aqueous solution were added thereto.

The mixture was co-precipitated at pH 11 for 8 hours at 40° C. at a reaction speed of about 800 rpm, thereby preparing a metal hydroxide precursor. The precursor was washed, dried in a 120° C. oven, and filtered and mixed with $Li_2CO_3$ in a weight ratio of about 1:1.03 using a handy mixer. The mixture was heated by increasing the temperature at a rate of 5° C./min to 900° C., and then fired at that temperature for about 10 hours, thereby preparing a lithium metal oxide positive active material including Li, transition elements (Me) (Ni, Co, and Mn), and Mg.

The Mg was doped in an amount of 4 mol % based on the entire amount of Ni, Co, and Mn, and had a doping mole ratio $A_{Li}/A_{Me}$ of 0.52.

Comparative Example 9

About 3M of a $NiSO_4$ aqueous solution, about 3M of a $CoSO_4$ aqueous solution, and about 3M of a $MnSO_4$ aqueous solution were mixed in a mole ratio of 6:2:2. The mixture was mixed with about 3M of a $MgSO_4$ aqueous solution in a mole ratio of 1:0.04. Next, about 7M of a NaOH aqueous solution and about 1M of a $NH_4OH$ aqueous solution were added thereto.

The resulting mixture was co-precipitated at pH 11 for 8 hours at 40° C. at a reaction speed of about 800 rpm, thereby preparing a metal hydroxide precursor. The precursor was washed, dried in a 120° C. oven, filtered, and then mixed with $Li_2CO_3$ in a weight ratio of about 1:1.15 using a handy mixer.

The resulting mixture was heated by increasing the temperature at a rate of 5° C./min to 850° C. and then fired at that temperature for about 10 hours, preparing a lithium metal oxide positive active material including Li, transition elements (Me) (Ni, Co, and Mn), and Mg. The Mg was doped in an amount of 4 mol % based on the entire amount of Ni, Co, and Mn, and had a doping mole ratio $A_{Li}/A_{Me}$ of 0.0008.

Experimental Example 1: Scanning Electron Microscope (Sem) Photograph of a Positive Active Material The positive active materials according to Examples 1 and 3 and Comparative Examples 1 to 3, 6, and 7 were photographed with a scanning electron microscope (SEM). The results were provided in FIGS. 2A to 8B.

Figure 2A:
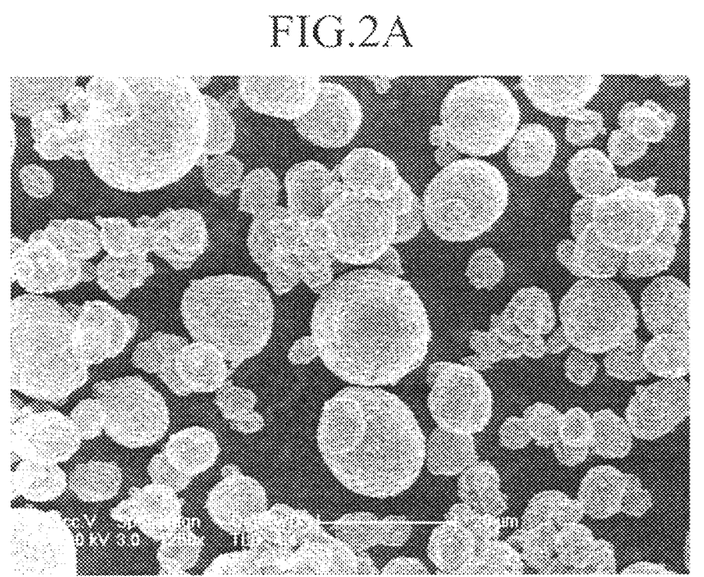
FIGS. 2A and 2B respectively show a 1250 times enlarged SEM photograph and a 20,000 times enlarged SEM photograph of a positive active material according to Example 1.
Figure 2B:
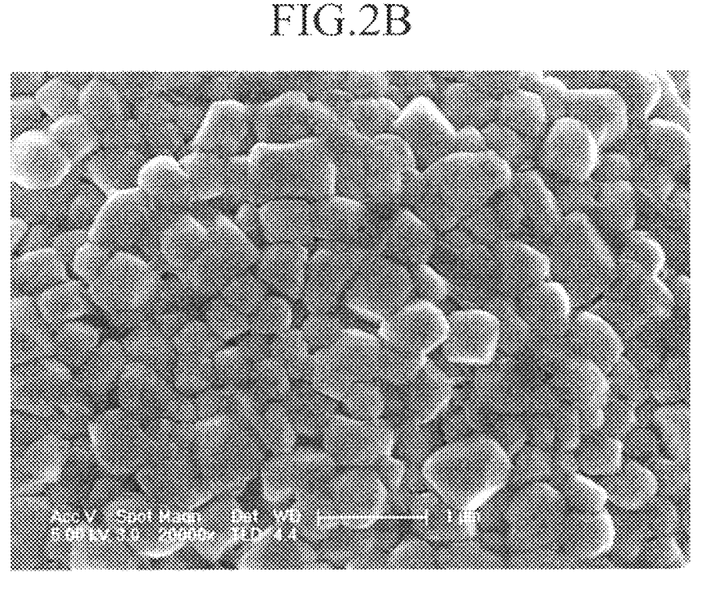
Figure 3A:
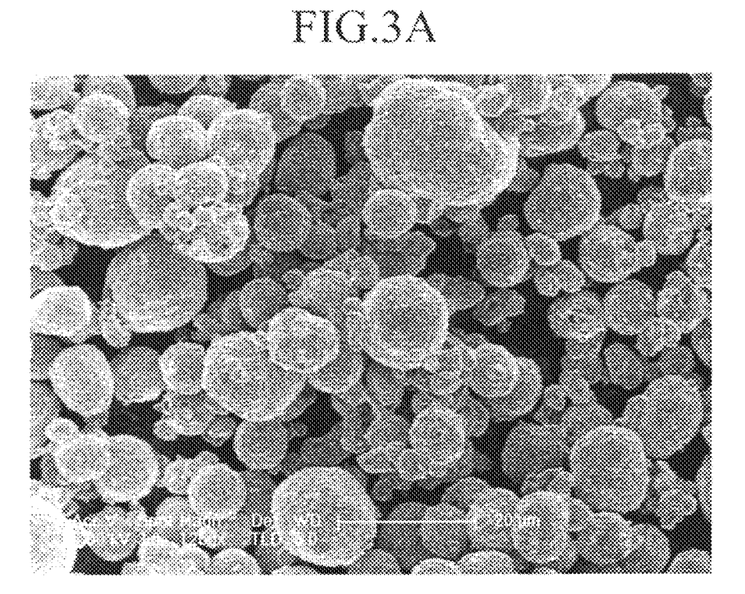
FIGS. 3A and 3B respectively show a 1250 times enlarged SEM photograph and a 20,000 times enlarged SEM photograph of a positive active material according to Example 3.
Figure 3B:
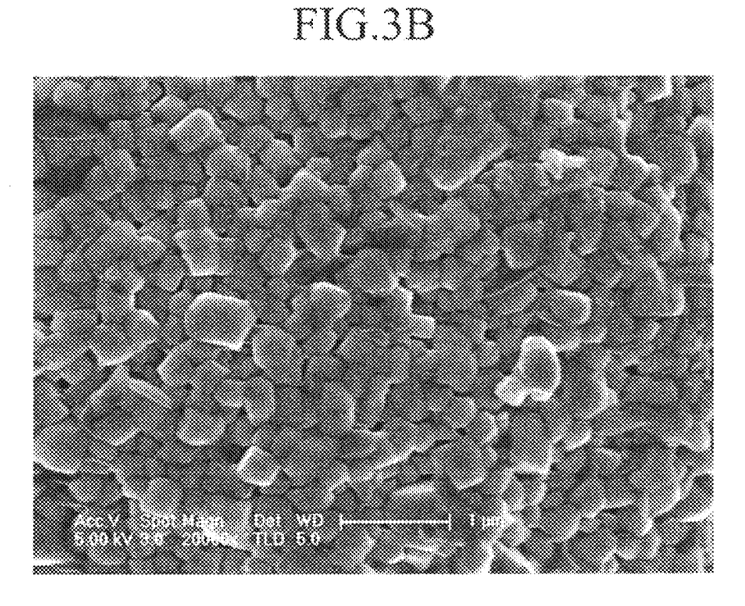

FIGS. 2A and 2B respectively provide a 1250 times enlarged SEM photograph and 20,000 times enlarged SEM photograph of the positive active material according to Example 1, and FIGS. 3A and 3B respectively provide a 1250 times enlarged SEM photograph and a 20,000 times enlarged SEM photograph of the positive active material according to Example 3. Referring to FIGS. 2A to 3B, the positive active materials according to Examples 1 and 3 had excellent crystal structure of a particle.

Figure 4A:
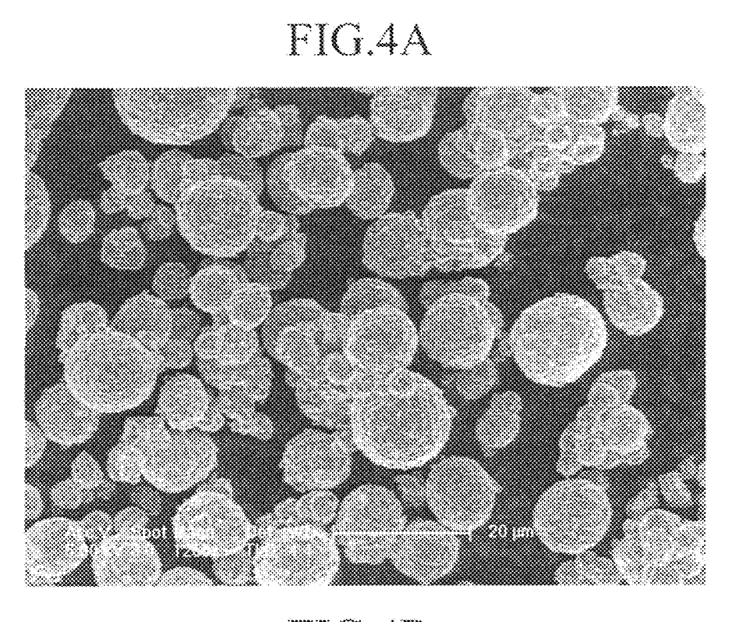
FIGS. 4A and 4B respectively show a 1250 times enlarged SEM photograph and a 20,000 times enlarged SEM photograph of a positive active material according to Comparative Example 1.
Figure 4B:
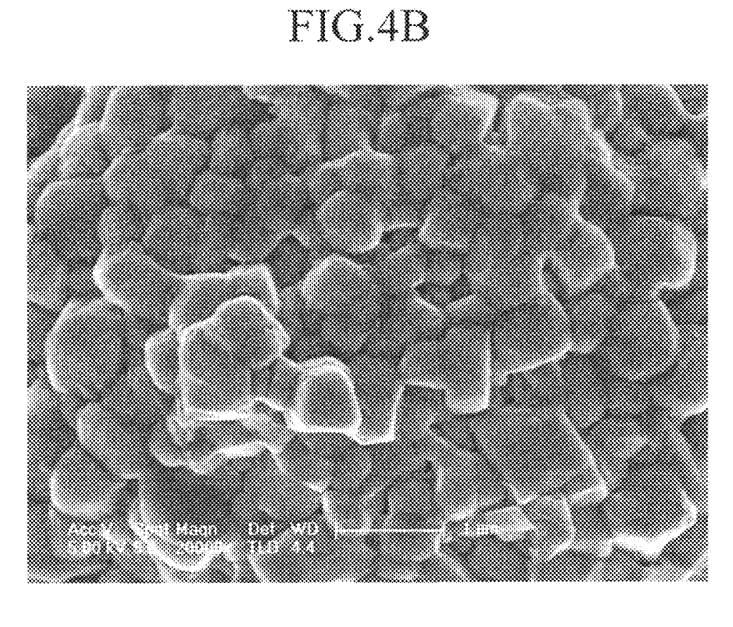

FIGS. 4A and 4B respectively provide a 1250 times enlarged SEM photograph and a 20,000 times enlarged SEM photograph of the positive active material according to Comparative Example 1. Referring to FIGS. 4A and 4B, the positive active materials including no doping element (M') according to Comparative Example 1 had no uniform crystal structure of a particle.

Figure 5A:
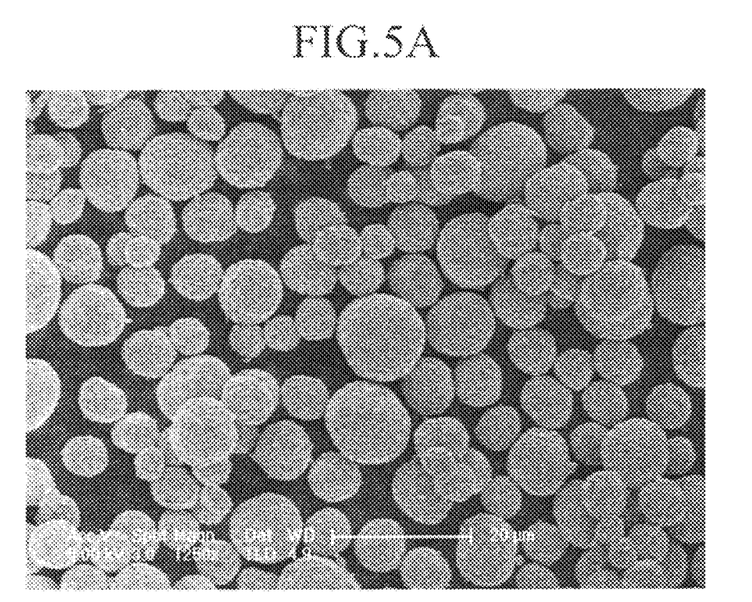
FIGS. 5A and 5B respectively show a 1250 times enlarged SEM photograph and a 20,000 times enlarged SEM photograph of a positive active material according to Comparative Example 2.
Figure 5B:
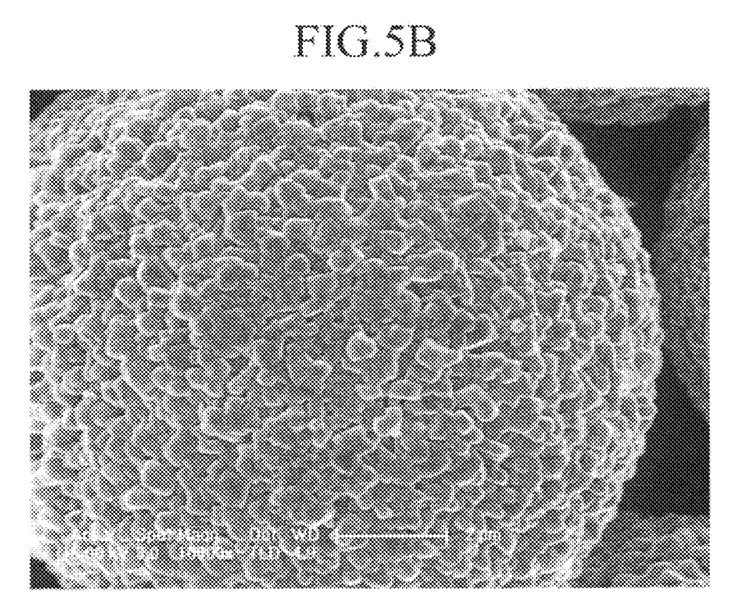
Figure 6A:
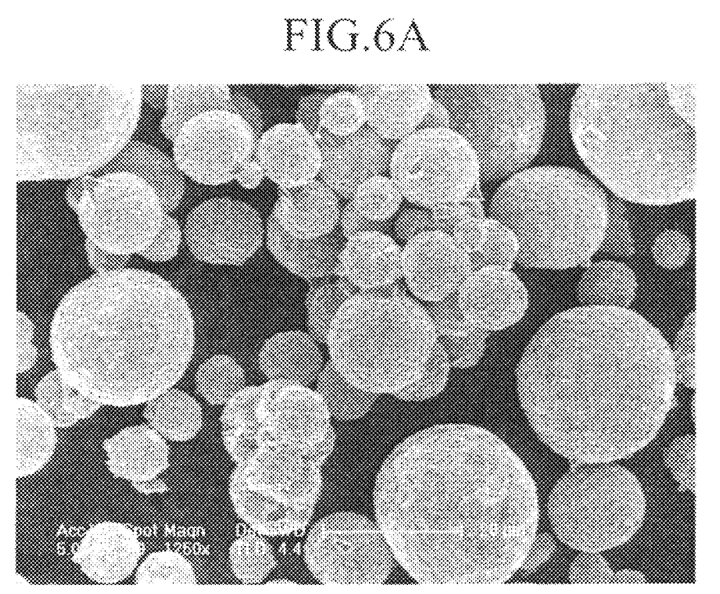
FIGS. 6A and 6B respectively show a 1250 times enlarged SEM photograph and a 20,000 times enlarged SEM photograph of a positive active material according to Comparative Example 3.
Figure 6B:
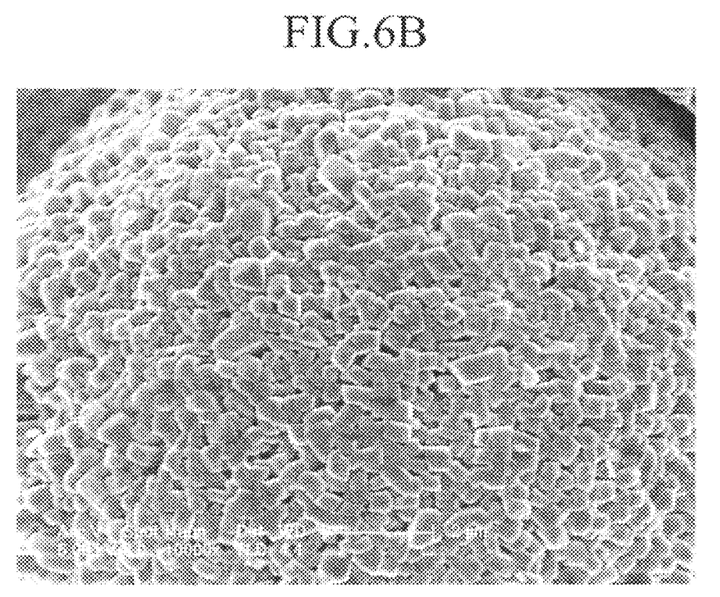

FIGS. 5A and 5B respectively provide a 1250 times enlarged SEM photograph and a 20,000 times enlarged SEM photograph of the positive active material according to Example 3, and FIGS. 6A and 6B respectively provide a 1250 times enlarged SEM photograph and a 20,000 times enlarged SEM photograph of the positive active material according to Example 4.

Figure 7A:
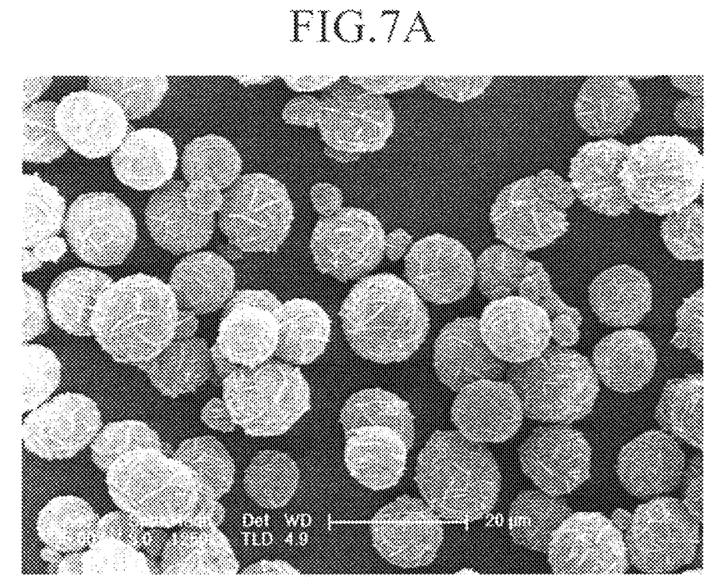
FIGS. 7A and 7B respectively show a 1250 times enlarged SEM photograph and a 20,000 times enlarged SEM photograph of a positive active material according to Comparative Example 6.
Figure 7B:
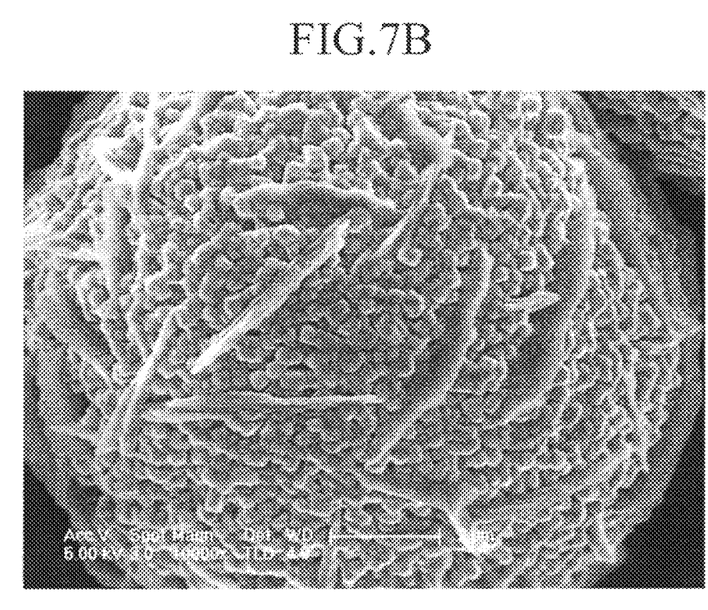
Figure 8A:
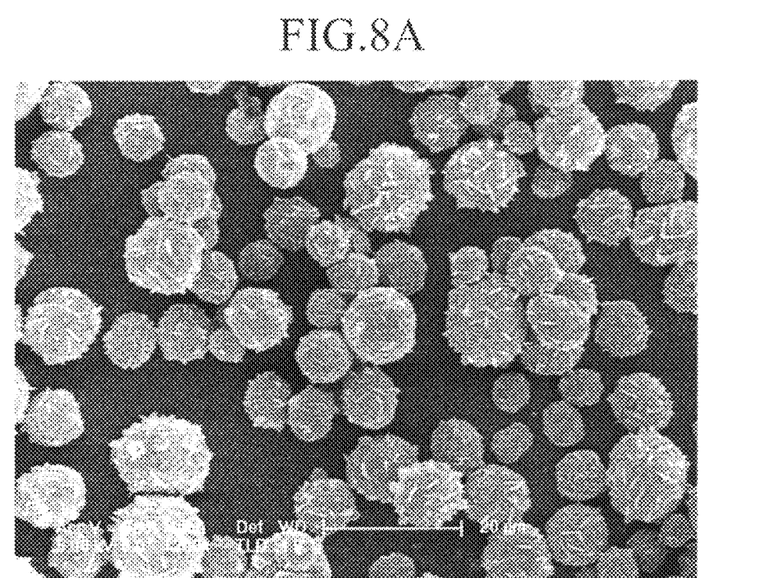
FIGS. 8A and 8B respectively show a 1250 times enlarged SEM photograph and a 20,000 times enlarged SEM photograph of a positive active material according to Comparative Example 7.
Figure 8B:
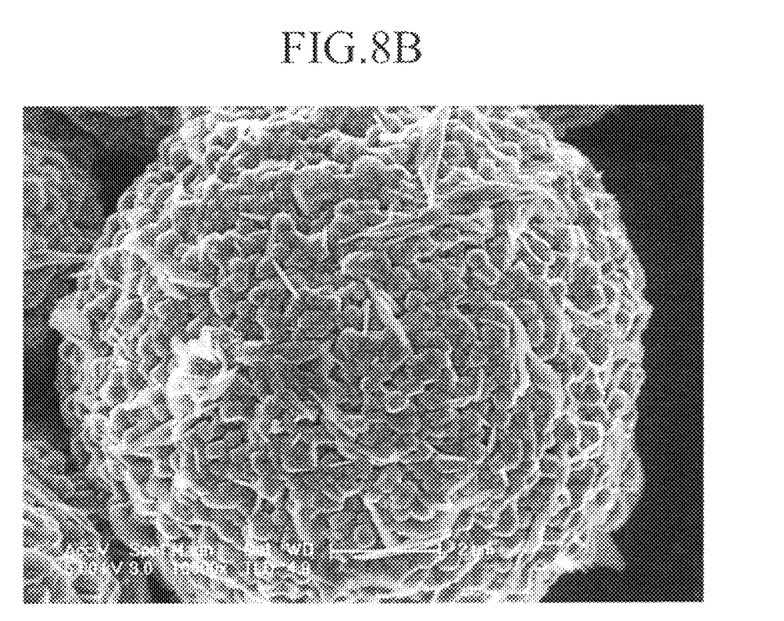

FIGS. 7A and 7B respectively provide a 1250 times enlarged SEM photograph and a 20,000 times enlarged SEM photograph of the positive active material according to Comparative Example 6, and FIGS. 8A and 8B respectively provide a 1250 times enlarged SEM photograph and a 20,000 times enlarged SEM photograph of the positive active material according to Comparative Example 7. Referring to FIGS. 7A to 8B, the positive active material had less than desired crystal (or no good crystal). When transition elements (Me) were included out of the set or predetermined composition ratio range and heat-treated at 850° C., a crystal was not well formed.

Experimental Example 2: DSC Evaluation of a Positive Active Material

The positive active materials according to Examples 1 to 4 and Comparative Examples 1 to 5 were respectively measured regarding thermal stability using a DSC measurer (DSC Q20). The results are provided in the following Table 1.

In Table 1, the positive active material according to one embodiment of the present invention had a lower heat flow maximum value (W/g) of the DSC graph than the ones of Comparative Examples 1 to 5. Accordingly, when transition elements (Me) were doped in a set or predetermined composition ratio, the positive active material had excellent thermal stability.

TABLE 1

| | Heat flow maximum value (W/g) |
|---|---|
| Example 1 | 13.8 |
| Example 2 | 12.5 |
| Example 3 | 17.5 |
| Example 4 | 11 |
| Comparative Example 1 | 20.5 |
| Comparative Example 2 | 19 |
| Comparative Example 3 | 32 |
| Comparative Example 4 | 25 |
| Comparative Example 5 | 37 |

Fabrication of a Rechargeable Lithium Battery Cell 94 wt % of the positive active materials according to Examples 1 to 4 and Comparative Examples 1 to 9, 3 wt % of polyvinylidene fluoride (PVDF), and 3 wt % of acetylene black were mixed and then dispersed into N-methyl-2-pyrrolidone, thereby preparing a slurry. Next, the slurry was coated on a glass plate, forming a positive active material layer thereon. The positive active material layer was then transferred onto a 15 μm-thick aluminum foil, thereby fabricating a positive electrode.

The positive electrode and a metal lithium as a counter electrode were used to fabricate a coin-type half-cell. Herein, an electrolyte solution was prepared by mixing ethylene carbonate (EC) and dimethyl carbonate (DMC) in a volume ratio of 3:7 and dissolving LiPF$_6$ in a concentration of 1.3M in the mixed solution.

Experimental Example 3: Charge and Discharge Characteristics of a Rechargeable Lithium Battery Cell Each rechargeable lithium battery cell including the positive active materials according to Examples 1 to 4 and Comparative Examples 1 to 9 was evaluated regarding charge and discharge characteristics. The results are provided in the following Table 2.

Each was charged at a rate of 0.1 C, rested for 10 minutes, and then discharged at a rate of 0.1 C. Next, each was charged and discharged at a rate of 0.2 C, 0.5 C, and 1.0 C in the same method as aforementioned. Each charge and discharge was respectively performed at 4.3V in a CC/CV mode. The following result shows initial capacity at a rate of 0.1 C.

TABLE 2

| | Charge capacity (0.1 C rate) (mAh/g) | Discharge capacity (0.1 C rate) (mAh/g) | Capacity retention (0.1 C rate) (%) |
|---|---|---|---|
| Example 1 | 197.9 | 177.5 | 89.7 |
| Example 2 | 197.9 | 176.7 | 89.3 |
| Example 3 | 196.1 | 172.2 | 87.8 |
| Example 4 | 191.5 | 164.7 | 86 |
| Comparative Example 2 | 190.1 | 165.7 | 87.2 |
| Comparative Example 3 | 183.5 | 160.1 | 87.2 |
| Comparative Example 4 | 175.2 | 152.2 | 86.9 |
| Comparative Example 5 | 174.2 | 151.6 | 87 |
| Comparative Example 6 | 187.4 | 159.5 | 85.1 |
| Comparative Example 7 | 184.5 | 155 | 83.9 |
| Comparative Example 8 | 187.9 | 158.2 | 84.2 |
| Comparative Example 9 | 179.2 | 153.8 | 85.8 |

Referring to Table 2, each rechargeable lithium battery cell including the positive active materials according to Examples 1 to 4 had higher charge capacity and discharge capacity than one including the positive active material including transition elements (Me) out of a set or predetermined composition ratio range according to Comparative Examples 2 to 5. Accordingly, when the positive active material includes transition elements (Me) with a set or predetermined composition ratio even if the transition elements (Me) are doped in the same amount, it may further improve charge capacity and discharge capacity compared with the positive active material including the transition elements (Me) out of the composition ratio range.

In addition, when a positive active material including transition elements (Me) out of a set or predetermined composition ratio range was prepared according to Comparative Examples 6 and 7, it may further deteriorate efficiency of a battery.

In addition, when a positive active material including transition elements (Me) of a set or predetermined composition ratio range and Mg of a set or predetermined mole ratio range of doping was prepared according to Comparative Examples 8 and 9, it may further deteriorate efficiency of a battery.

Figure 9:
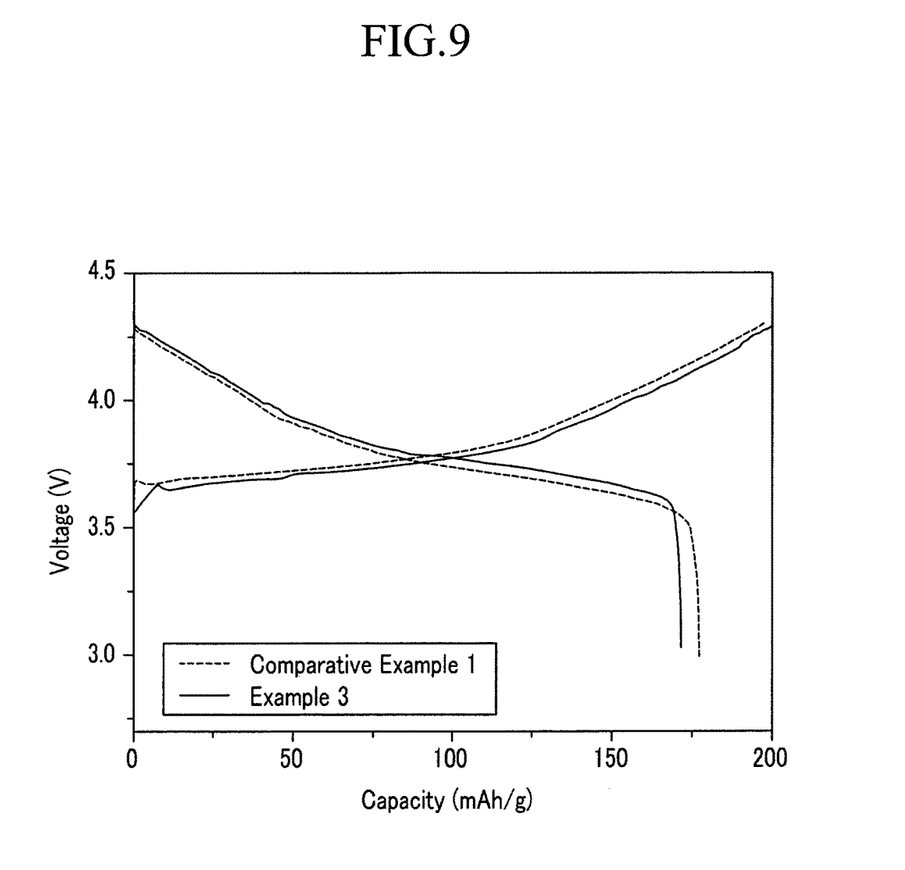
FIG. 9 shows a charge and discharge graph of a rechargeable lithium battery including each positive active material according to Example 3 and Comparative Example 1.

FIG. 9 shows the charge and discharge graph of rechargeable lithium battery cells including each positive active material according to Example 3 and Comparative Example 1. Referring to FIG. 9, the positive active material including a doping element (M') turned out to have an increased discharge voltage than the one including no doping element (M').

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A positive active material for a rechargeable lithium battery comprising a lithium metal oxide represented by the following Chemical Formula 1:

$$Li_aMeM'_kO_2 \qquad \text{Chemical Formula 1}$$

wherein, in Chemical Formula 1,
Me is $Ni_xCo_yMn_z$, M' is Mg, $0.95 \le a < 1.05$, $0.001 \le k \le 0.1$, $0.5 < x \le 0.65$, $0.1 < y \le 0.25$, $0.1 < z \le 0.25$, $x+y+z+k=1$,
M' is doped at a Li site and at least one of Ni, Co, and Mn sites,
M' is doped in an amount at 0.1 mol % or 10 mol % or between 0.1 mol % and 10 mol % based on the total amount of Ni, Co, and Mn,
a doping mole ratio of M' doped at the Li site with respect to a Me site is in the following range: about $0.05 \le A_{Li}/A_{Me} \le $ about 0.33, and
wherein the positive active material has a heat flow maximum value at 10 W/g or 18 W/g or between 10 W/g and 18 W/g in a Differential Scanning Calorimetry (DSC) measurement.

2. The positive active material of claim 1, wherein in Chemical Formula 1, M' is doped in the amount at 1 mol % or 4 mol % or between 1 mol % and 4 mol % based on the total amount of Ni, Co, and Mn.

3. A method of preparing a positive active material, for a rechargeable lithium battery the method comprising:
preparing a precipitate by co-precipitating each metal source material comprising Ni, Co, and Mn, and a doping element (M') source material comprising Mg, and ammonium hydroxide ($NH_4OH$) or sodium hydroxide (NaOH);
mixing the precipitate with a lithium source material in a weight ratio at 1:1 or 1:1.05 or between 1:1 and 1:1.05; and
heat-treating the mixture to prepare a lithium metal oxide represented by the following Chemical Formula 1:

$$Li_aMeM'_kO_2 \qquad \text{Chemical Formula 1}$$

wherein, in Chemical Formula 1,
Me is $Ni_xCo_yMn_z$, M' is Mg, $0.95 \leq a < 1.05$, $0.001 \leq k \leq 0.1$, $0.5 < x \leq 0.65$, $0.1 < y \leq 0.25$, $0.1 < z \leq 0.25$, $x+y+z+k=1$,
M' is doped at a Li site and at least one of Ni, Co, and Mn sites,
M' is doped in an amount at 0.1 mol % or 10 mol % or between 0.1 mol % and 10 mol % based on the total amount of Ni, Co, and Mn, and
a doping mole ratio of M' doped at the Li site with respect to a Me site is in the following range: about $0.05 \leq A_{Li}/A_{Me} \leq$ about 0.33.

4. The method of claim 3, wherein the heat-treating is performed at a temperature at 700° C. or between 700° C. and 900° C.

5. The method of claim 3, wherein the heat-treating is performed at a temperature at 800° C. or between 800° C. and 900° C.

6. The method of claim 3, wherein the heat-treating is performed for about 8 to about 15 hours.

7. The method of claim 3, wherein the heat-treating is performed for about 8 to about 11 hours.

8. The method of claim 3, wherein the co-precipitating is performed at a reaction speed at 600 rpm or 800 rpm or between 600 rpm and 800 rpm.

9. The method of claim 3, wherein the co-precipitating is performed at pH of about 10 to about 12.

10. The method of claim 3, wherein the co-precipitating is performed for about 8 to about 10 hours.

11. The method of claim 3, wherein the co-precipitating is performed at a temperature at 35° C. or 40° C. or between 35° C. and 40° C.

12. The method of claim 3, wherein in Chemical Formula 1, M' is doped in the amount at 1 mol % or 4 mol % or between 1 mol % and 4 mol % based on the total amount of Ni, Co, and Mn.

13. A rechargeable lithium battery comprising:
a positive electrode comprising a lithium metal oxide positive active material represented by the following Chemical Formula 1;
a negative electrode; and
an electrolyte solution impregnating the positive electrode and the negative electrode:

$$Li_aMeM'_kO_2 \qquad \text{Chemical Formula 1}$$

wherein, in Chemical Formula 1,
Me is $Ni_xCo_yMn_z$, M' is Mg, $0.95 \leq a < 1.05$, $0.001 \leq k \leq 0.1$, $0.5 < x \leq 0.65$, $0.1 < y \leq 0.25$, $0.1 < z \leq 0.25$, $x+y+z+k=1$,
M' is doped at a Li site and at least one of Ni, Co, and Mn sites,
M' is doped in an amount at 0.1 mol % or 10 mol % or between 0.1 mol % and 10 mol % based on the total amount of Ni, Co, and Mn,
a doping mole ratio of M' doped at the Li site with respect to a Me site is in the following range: about $0.05 \leq A_{Li}/A_{Me} \leq$ about 0.33, and
wherein the positive active material has a heat flow maximum value at 10 W/g or 18 W/g or between 10 W/g and 18 W/g in a Differential Scanning Calorimetry (DSC) measurement.

14. The rechargeable lithium battery of claim 13, wherein in Chemical Formula 1, M' is doped in the amount at 1 mol % or 4 mol % or between 1 mol % and 4 mol % based on the total amount of Ni, Co, and Mn.

15. The rechargeable lithium battery of claim 13, wherein the rechargeable battery has discharge capacity at 160 mAh/g or 190 mAh/g or between 160 mAh/g and 190 mAh/g.

* * * * *